(12) United States Patent
Vasseur et al.

(10) Patent No.: US 8,619,576 B2
(45) Date of Patent: Dec. 31, 2013

(54) SELECTIVE TOPOLOGY ROUTING FOR DISTRIBUTED DATA COLLECTION

(75) Inventors: Jean-Philippe Vasseur, Saint Martin Duriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 13/180,998

(22) Filed: Jul. 12, 2011

(65) Prior Publication Data

US 2013/0016612 A1    Jan. 17, 2013

(51) Int. Cl.
  *G01R 31/08*  (2006.01)
  *G06F 11/00*  (2006.01)
  *G08C 15/00*  (2006.01)
  *H04J 1/16*  (2006.01)
  *H04J 3/14*  (2006.01)
  *H04L 1/00*  (2006.01)
  *H04L 12/26*  (2006.01)

(52) U.S. Cl.
  USPC .......................................... 370/235; 370/252

(58) Field of Classification Search
  USPC ................................. 370/235, 252
  See application file for complete search history.

(56) References Cited

U.S. PATENT DOCUMENTS

| | | | |
|---|---|---|---|
| 7,286,491 B1 | 10/2007 | Smith | |
| 7,366,111 B2 | 4/2008 | Thubert et al. | |
| 7,606,177 B1 | 10/2009 | Mahajan et al. | |
| 7,646,733 B2 | 1/2010 | Tallet et al. | |
| 7,720,010 B2 | 5/2010 | Ribiere et al. | |
| 7,808,930 B2 | 10/2010 | Boers et al. | |
| 7,821,972 B1 | 10/2010 | Finn et al. | |
| 2003/0188295 A1* | 10/2003 | Adl-Tabatabai et al. | 717/126 |
| 2006/0045028 A1 | 3/2006 | Hasan et al. | |
| 2007/0091811 A1* | 4/2007 | Thubert et al. | 370/238 |
| 2008/0240078 A1 | 10/2008 | Thubert et al. | |
| 2011/0116389 A1* | 5/2011 | Tao et al. | 370/252 |
| 2011/0228696 A1* | 9/2011 | Agarwal et al. | 370/253 |
| 2011/0231573 A1* | 9/2011 | Vasseur et al. | 709/238 |
| 2012/0019535 A1* | 1/2012 | Miyashita et al. | 345/440 |
| 2012/0117213 A1* | 5/2012 | Shaffer et al. | 709/223 |
| 2013/0016612 A1* | 1/2013 | Vasseur et al. | 370/235 |

OTHER PUBLICATIONS

Caesar, et al., "ROFL: Routing on Flat Labels", SIGCOMM '06, Sep. 11-15, 2006, 12 pages, Pisa, Italy.

(Continued)

*Primary Examiner* — Michael Thier
*Assistant Examiner* — Benjamin H Elliott, IV
(74) *Attorney, Agent, or Firm* — Edwards Wildman Palmer LLP; James M. Behmke; Stephen D. LeBarron

(57) ABSTRACT

In one embodiment, a device, such as a network management server, determines a traffic matrix of a mesh network, where the traffic matrix indicates an amount of traffic per type of traffic transitioning between the mesh network and a global computer network via one or more current root devices. One or more optimized root devices may then be selected for corresponding directed acyclic graphs (DAGs) based on the amount of traffic and type of traffic. As such, a DAG formation request may be transmitted to the selected root devices, carrying a characteristic for a corresponding DAG to form by the respective selected root devices that indicates which one or more types of traffic correspond to the corresponding DAG.

20 Claims, 10 Drawing Sheets

(56) References Cited

OTHER PUBLICATIONS

De Jong, et al., "Notification of Transmittal of the International Search Report and the Written Opinion of the International Searching Authority, or the Declaration", Patent Cooperation Treaty, Sep. 6, 2012, 13 pages, PCT/US2012/046203, European Patent Office, Rijswijk, Netherlands.

Hui, et al., "IPv6 in Low-Power Wireless Networks", Proceedings of the IEEE, Nov. 2010, pp. 1865-1878, vol. 98, No. 11.

"RPL: IPv6 Routing Protocol for Low Power and Lossy Networks" <draft-ietf-roll-rpl-19> by Winter, at al. (Mar. 13, 2011 version).

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-11> by Thurbet May 5, 2011 version).

"The Minimum Rank Objective Function with Hysteresis" <draft-ietf-roll-minrank-hysteresis-of-03> by O. Gnawali et al. (May 3, 2011 version).

* cited by examiner

SELECTIVE TOPOLOGY ROUTING FOR DISTRIBUTED DATA COLLECTION

TECHNICAL FIELD

The present disclosure relates generally to computer networks, and, more particularly, to low power and lossy networks (LLNs), found for example in Smart Grid and Advanced Metering Infrastructure (AMI) technologies.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One of the main challenges in LLNs is to optimize the use of scare network resources such as the network capacity considering the very limited bandwidth available in the network. Since a significant proportion of the traffic is point-to-multipoint (P2MP) and multipoint-to-point (MP2P), bandwidth limitation becomes a limiting factor closer to the data collection point (e.g., a sink) where traffic increases, thus leading to congestion, quality of service (QoS) degradation, and also battery depletion when nodes are battery operated.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
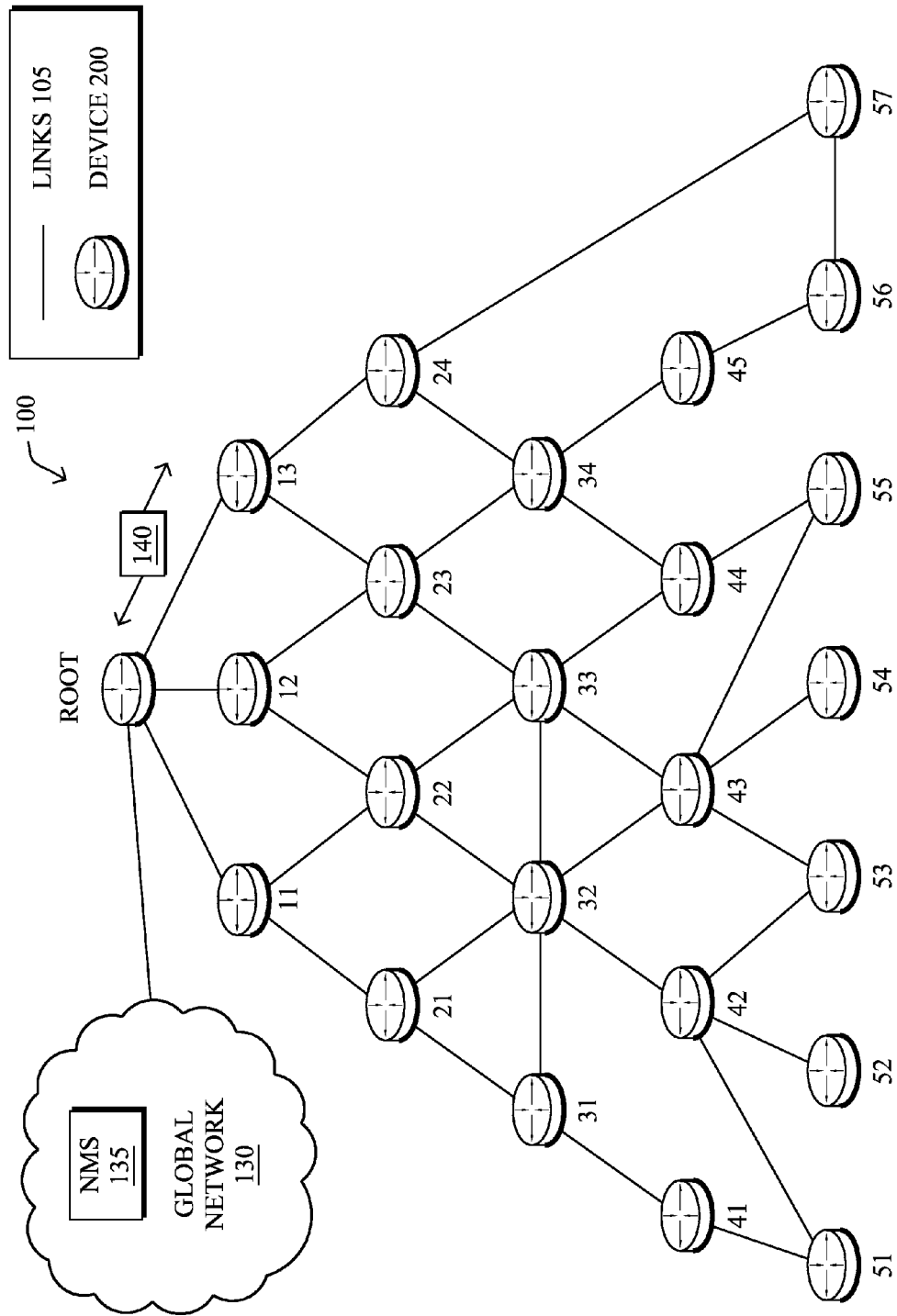
FIG. 1 illustrates an example communication network.

According to one or more embodiments of the disclosure, a device, such as a network management server, determines a traffic matrix of a mesh network, where the traffic matrix indicates an amount of traffic per type of traffic transitioning between the mesh network and a global computer network via one or more current root devices. One or more optimized root devices may then be selected for corresponding directed acyclic graphs (DAGs) based on the amount of traffic and type of traffic. As such, a DAG formation request may be transmitted to the selected root devices, carrying a characteristic for a corresponding DAG to form by the respective selected root devices that indicates which one or more types of traffic correspond to the corresponding DAG.

According to one or more additional embodiments of the disclosure, a selected root device receives the DAG formation, and in response, initializes the corresponding DAG, and advertises the characteristic to indicate, to nodes joining the corresponding DAG, which one or more types of traffic are served by the corresponding DAG.

Also, according to one or more additional embodiments of the disclosure, a node receives the DAG advertisement for a first DAG and a first type of traffic, and another DAG advertisement for a second DAG and a second type of traffic. After joining both DAGs, the node may then transmit traffic of the first or second type on the first or second DAG, respectively.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 110 (e.g., labeled as shown, "root," "11," "12," . . . "57") interconnected by various methods of communication. For instance, the links 105 as shown may be shared media (e.g., wireless links, PLC links, etc.) of a mesh network, where certain nodes, such as, e.g., routers, sensors, computers, etc., may be in communication with other nodes, e.g., based on distance, signal strength, current operational status, location, etc. Also, via a global computer network 130, such as a WAN, the mesh network may be in communication with one or more network management servers 135 (or other head-end applications or devices). Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
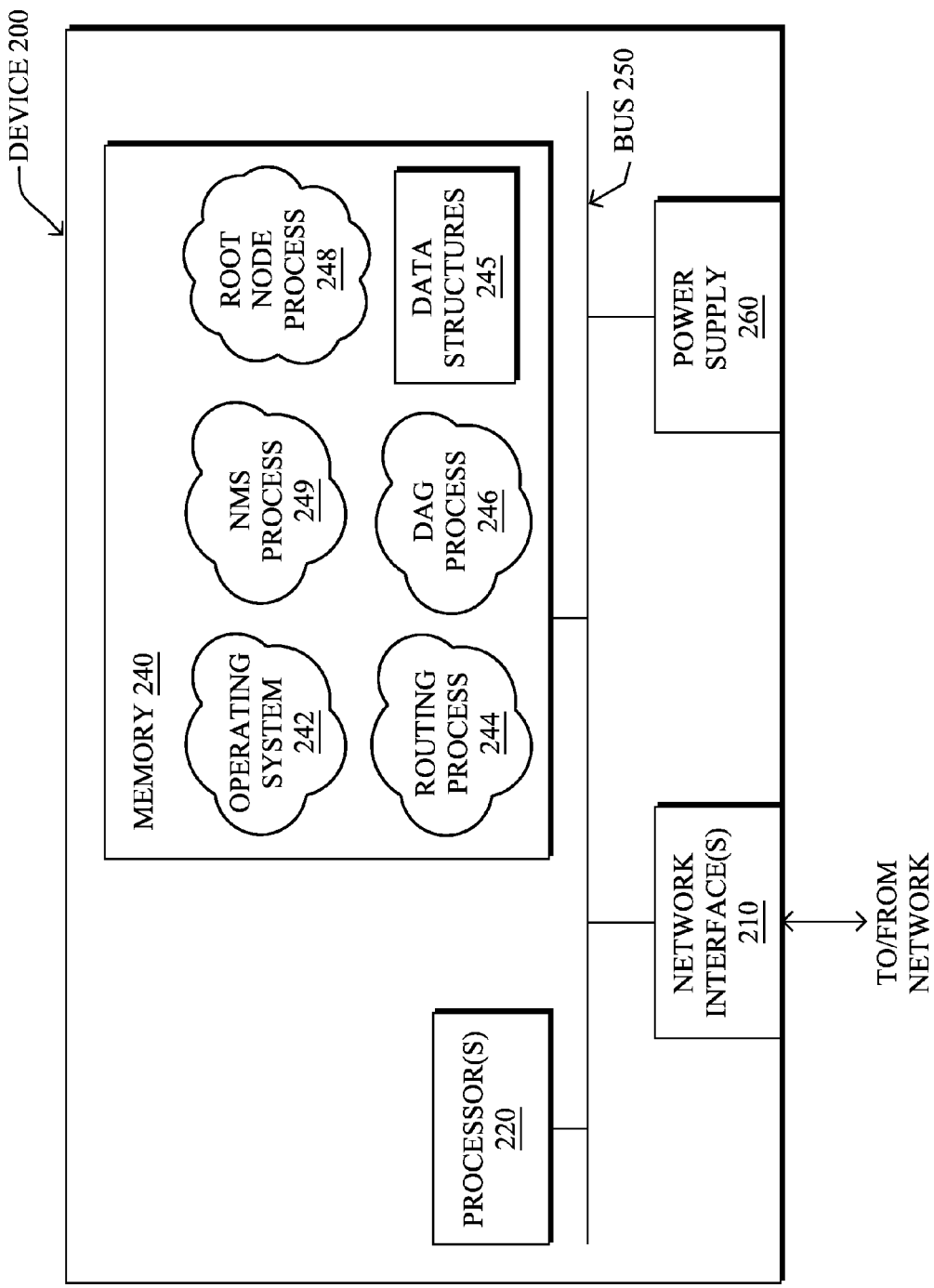
FIG. 2 illustrates an example network device/node.

FIG. 2 is a schematic block diagram of an example node/device 200 that may be used with one or more embodiments described herein, e.g., as any of the nodes 110 in the mesh network shown in FIG. 1 above, and also the NMS (or similar device) 135. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links (e.g., 105) coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise, on a node 110, routing process/services 244, a directed acyclic graph (DAG) process 246, and an illustrative root node process 248 on capable nodes 110 in the mesh network. Alternatively, for an NMS 135, the processes may comprise an illustrative NMS process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
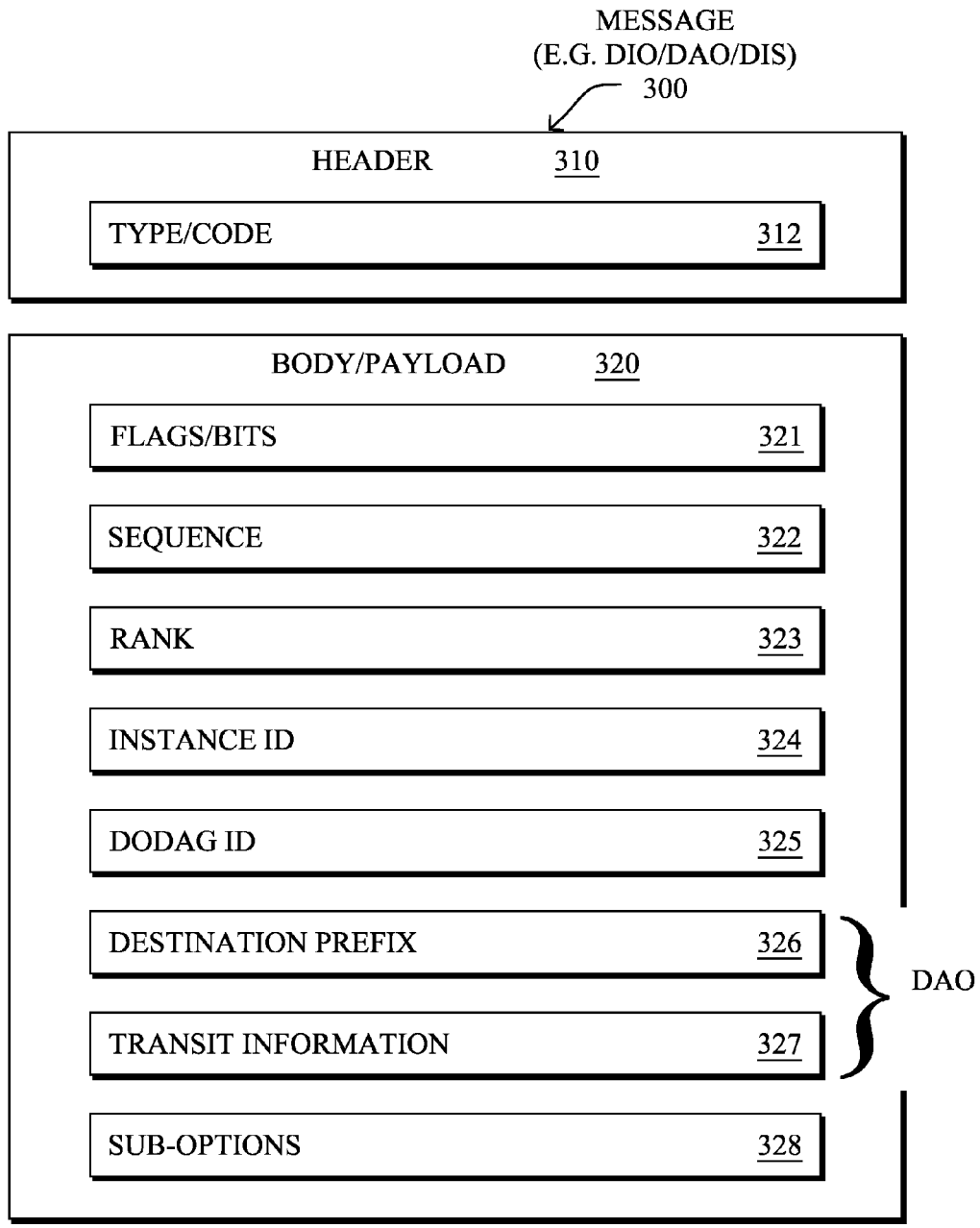
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
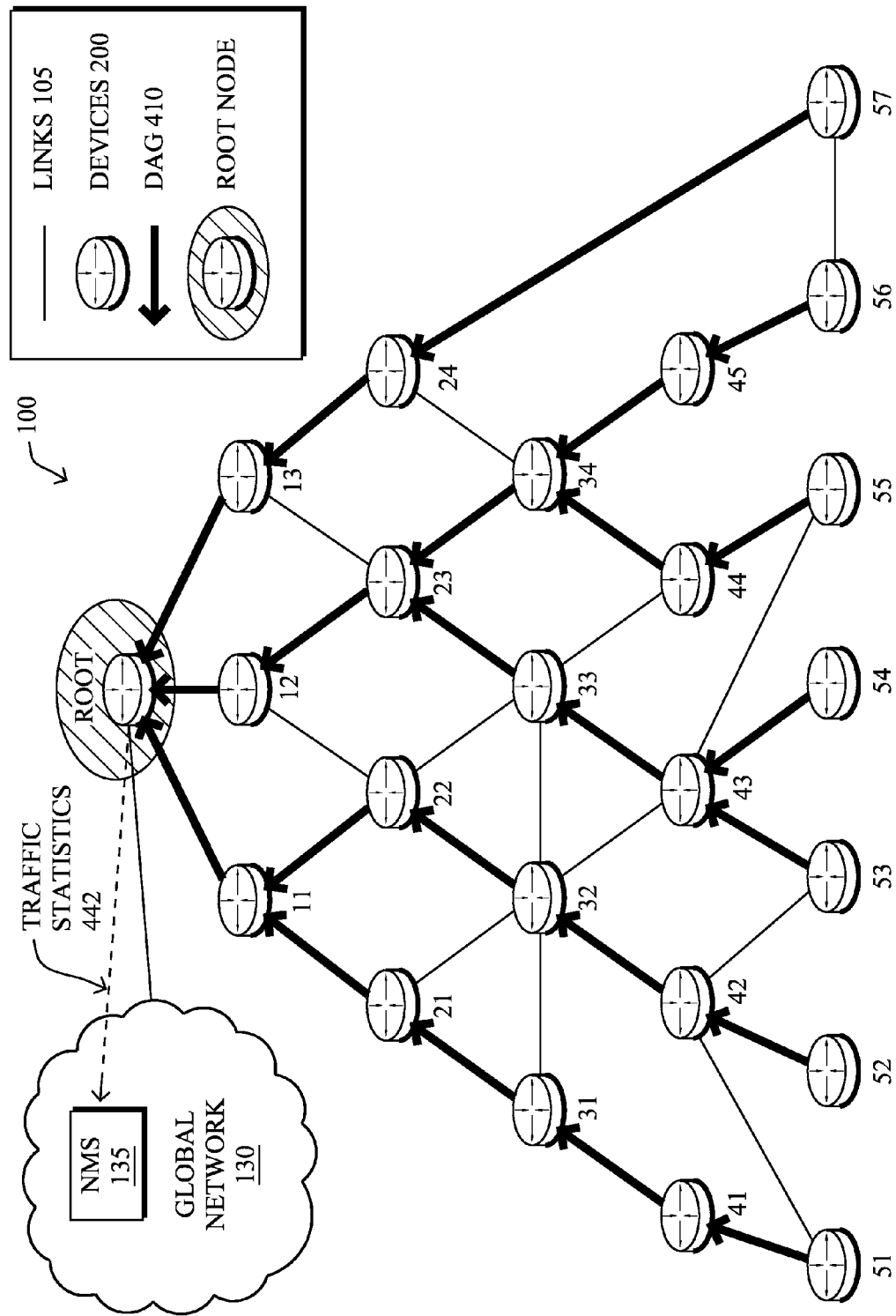
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, one of the main challenges in LLNs is to optimize the use of scare network resources such as the network capacity considering the very limited bandwidth available in the network. Since a significant proportion of the traffic is point-to-multipoint (P2MP) and multipoint-to-point (MP2P), bandwidth limitation becomes a limiting factor closer to the data collection point (e.g., a sink) where traffic increases, thus leading to congestion, quality of service (QoS) degradation, and also battery depletion when nodes are battery operated.

Various techniques have been specified with the aim to help with traffic congestion in LLNs. For example, data aggregation has been utilized on nodes in the network for traffic reduction, as well as constrained-routing so as to avoid nodes with very limited resources and dynamic routing metrics to avoid congested links. Also, techniques have increased the number of paths to the sink/root, and/or applied certain traffic load balancing techniques. Still, traffic congestion close to the root devices of LLNs remains a major challenge.

Selective Topology Routing

The techniques herein provide an NMS-based approach to traffic congestion in an LLN that consists of building routing topologies used for data gathering (e.g., DAGs) on a per-traffic type basis, and potentially according to a specific schedule. For instance, the techniques are based on traffic analysis, and dynamically select different root nodes (sinks) to initiate the routing topologies. As described herein, the mechanisms can be dynamically triggered by the NMS according to on-going traffic matrix analysis and network data driven events.

Specifically, according to one or more embodiments of the disclosure as described in detail below, a device, such as NMS 135, determines a traffic matrix of a mesh network, where the traffic matrix indicates an amount of traffic per type of traffic transitioning between the mesh network and a global computer network 130 via one or more current root devices. One or more optimized root devices may then be selected for corresponding DAGs based on the amount of traffic and type of traffic. As such, a DAG formation request may be transmitted to the selected root devices, carrying a characteristic for a corresponding DAG to form by the respective selected root devices that indicates which one or more types of traffic correspond to the corresponding DAG.

Illustratively, the techniques described herein may be performed by hardware, software, and/or firmware, such as in accordance with the NMS process 249 (when performed by the NMS 135), which may contain computer executable instructions executed by the processor 220 to perform functions relating to the novel techniques described herein. Also, when performed by a potential root node, or by any node in the mesh network, then the techniques may be performed in accordance with a root node process 248 (on potential root nodes), e.g., in conjunction with routing process 244 and/or DAG process 246 (on any node 110). For example, the techniques herein may be treated as extensions to conventional protocols, such as the RPL protocol or other routing topology protocols, and as such, may be processed by similar components understood in the art that execute those protocols, accordingly.

Operationally, the first component of this invention relies on gathering the traffic matrix by the NMS. In particular, the NMS 135 (or other similar head-end application) determines a traffic matrix of a mesh network that indicates an amount of traffic per type of traffic (and potentially the associated schedule) transitioning between the mesh network and the global computer network 130 via one or more current root devices. For example, in current Smart Grid networks, such as AMI (Advanced metering) but also telemetry networks, traffic flows are mostly P2MP and M2MP where traffic aggregates as it is closer to the data collection point (the sink or DAG root in the case of RPL). Different known techniques (e.g., the "Nedlow" traffic monitoring process available from Cisco Systems, Inc. of San Jose, Calif.) or IPIX can be used in the network in order to determine the traffic matrix characteristic of the network such as source/destination, volume/amount of traffic (e.g., in bytes or packets), type of traffic, time of the day, etc. Illustratively, such traffic monitoring may be performed by current root nodes, which may return traffic statistics 442 (in FIG. 4) to the NMS.

Figure 5:
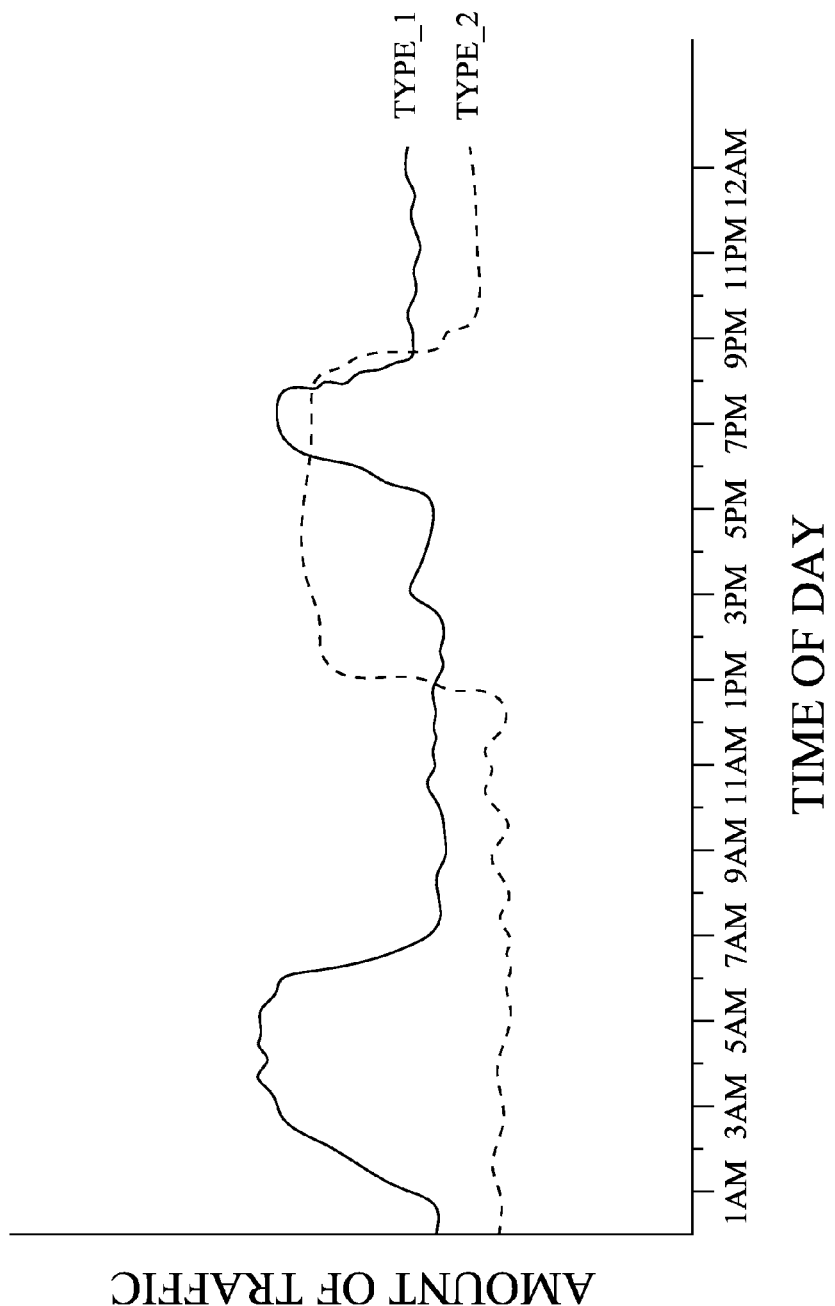
FIG. 5 illustrates an example representation of traffic flows in the network.

Once the traffic matrix has been collected (e.g., stored as a data structure 245), the NMS 135 determines for each traffic type (characterized by the traffic's class of service, application, priority, data type, size, association with a particular head-end server/NMS, etc.) when traffic loads occur in the network (e.g., time of day). For example, as shown in FIG. 5, it may be illustratively determined that there is a spike of traffic of type_1 (e.g., a meter readout) occurring every day from 1:00 am to 5:00 am and another from 4:00 pm to 6:00 pm, where a spike of traffic of type_2 (e.g., energy load curves) will take place from 11:00 am to 6:00 pm. As such, there is an overlapping spike a traffic of type_1 and type_2 occurring between 4:00 pm and 6:00 pm.

Once the traffic matrix has been gathered, the NMS determines an optimal number of routing topologies (e.g., DAGs in the case of RPL) and the location of their root node. In other words, the NMS selects one or more optimized root devices for corresponding DAGs based on the amount of traffic and type of traffic (e.g., and per time of day). For example, if it is determined that traffic of type x and y experiences simultaneous spikes, two routing topologies (e.g., DAGs) could be advantageously formed so as to collect the traffic along DAGs rooted by different roots/sinks.

It is worth pointing out that in LLNs used for Smart Grid or Telemetry (smart cities, smart water networks), the DAG root is in communication with a global computer network 130, such as either an IP backbone provisioned with sufficient bandwidth or a 3G connection (for example in the case of a AMI network) to the Data Center or Scada application, as may be appreciated by those skilled in the art. Accordingly, the selection of potential root nodes (or sinks) may be based on knowledge of node capability, which may be obtained through various advertisement protocols or else may be configured on the NMS.

Figure 6:
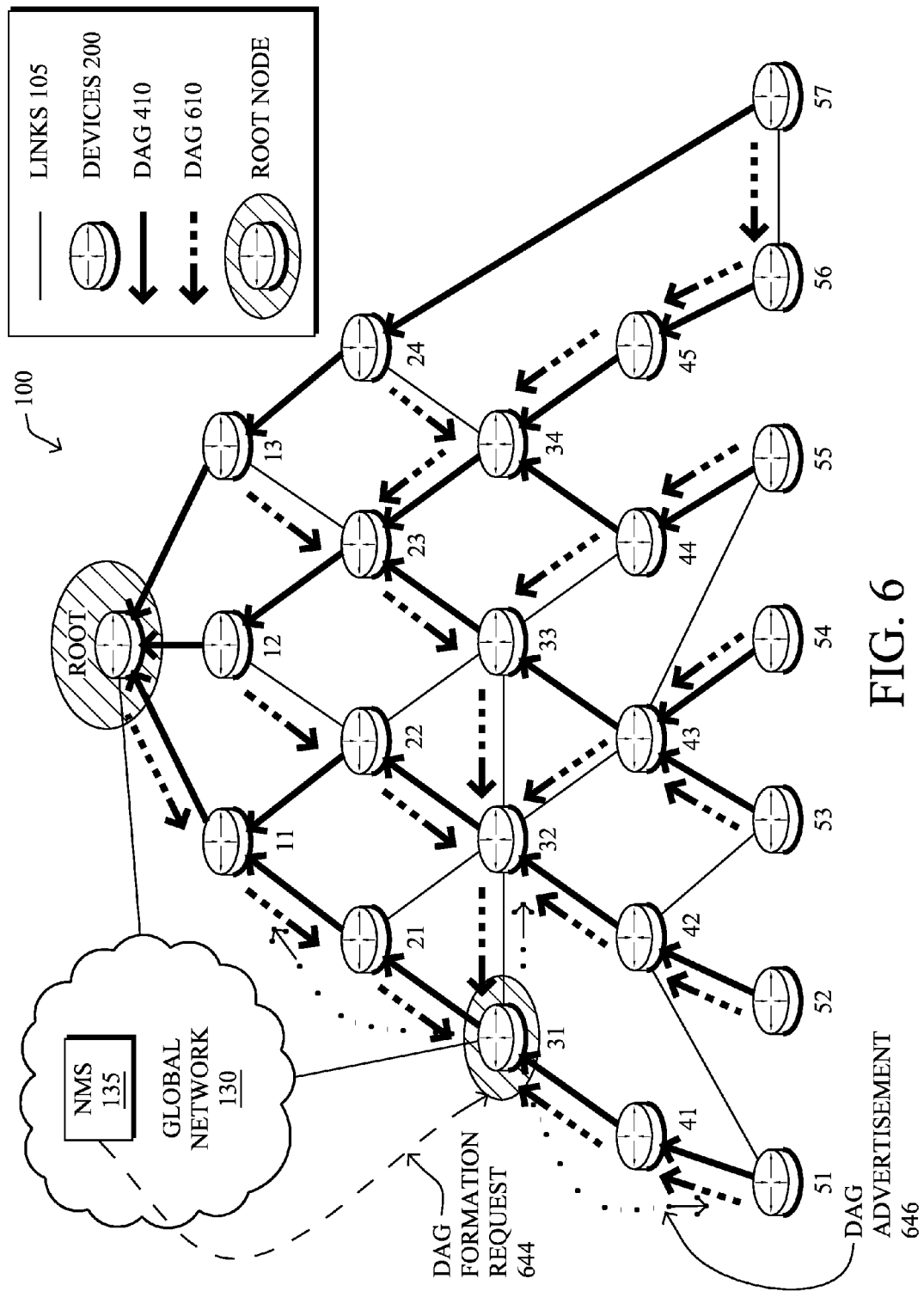
FIG. 6 illustrates an example second DAG in the communication network.

FIG. 6 illustrates an example of a second DAG 610 that may be established in the network 100 in response to the traffic matrix. In particular, assuming that node 31 is a potential root node (e.g., has connectivity to the global computer network 130), then the NMS 135 may select node 31 as a new root node, and instructs node 31 to initiate the corresponding new DAG 610, accordingly. For instance, the NMS may send a unicast DAG formation request 644 to the designated root node (e.g., node 31), along with the DAG characteristics such as:

The traffic type(s), e.g., characterized by the CoS (Class of Service), application, priority, etc.; and (Optionally) a schedule specifying the time of the day during which the DAG should be active (used for data collection of traffic of type_x).

Note that more than one root may be used to collect traffic of the same type. For example, in the case of RPL, an instance can consist of multiple DAGs. As such, a plurality of optimized root devices may be selected for corresponding DAGs, where the characteristics for the corresponding DAGs indicate at least one overlapping type of traffic between them (e.g., two DAGs may both service traffic of type_x). In determining how best to service the particular traffic mix, the NMS should take into account the ability to use multiple DAGs for traffic of the same type.

Note further that more complex arrangements may be made, particularly given time of day considerations, such as using one DAG for traffic of type_x at a first time, and another DAG for traffic of type_x at another time, or else using one DAG for traffic of type_x at a first time, and that same DAG for traffic of type_y at another time.

Upon receiving a DAG formation request 644 at a selected root device (e.g., node 31) of a mesh network, the new root device (or current root device that has been requested to update its current DAG) may initialize (or update) the corresponding DAG as requested in the DAG formation request. Specifically, the characteristic(s) for the corresponding DAG may advertised (DAG advertisement 646) to indicate, to nodes in the mesh network joining the corresponding DAG, which one or more types of traffic are served by the corresponding DAG. For example, a newly defined object may be used by the particular root node in order to characterize the traffic collected by (or distributed via) the corresponding DAG, which is propagated either using a multicast message sent to the nodes in the network or a routing control plane message (for example, such object could be carried in RPL DIO message 300).

In accordance with one or more embodiments herein, each node 110 in the mesh network may then join the corresponding DAGs (e.g., 410 and 610), and may direct or receive the traffic according to the traffic characteristic propagated along the DAG, e.g., and the potential proposed schedule. In this manner, though the DAGs will generally not be diverse (i.e., they will share links and nodes), the aggregation of the routes toward the root nodes have been diffused to a plurality of root nodes, thereby alleviating the congestion at a single root node.

Illustratively, a learning engine may be used on the NMS 135 so as to continue collecting traffic matrix information in order to adjust the selected (optimized) root devices, and the corresponding routing topologies and traffic characteristics. As such, traffic changes over time may be dynamically accommodated, thus providing an adaptive DAG allocation technique.

Figure 7:
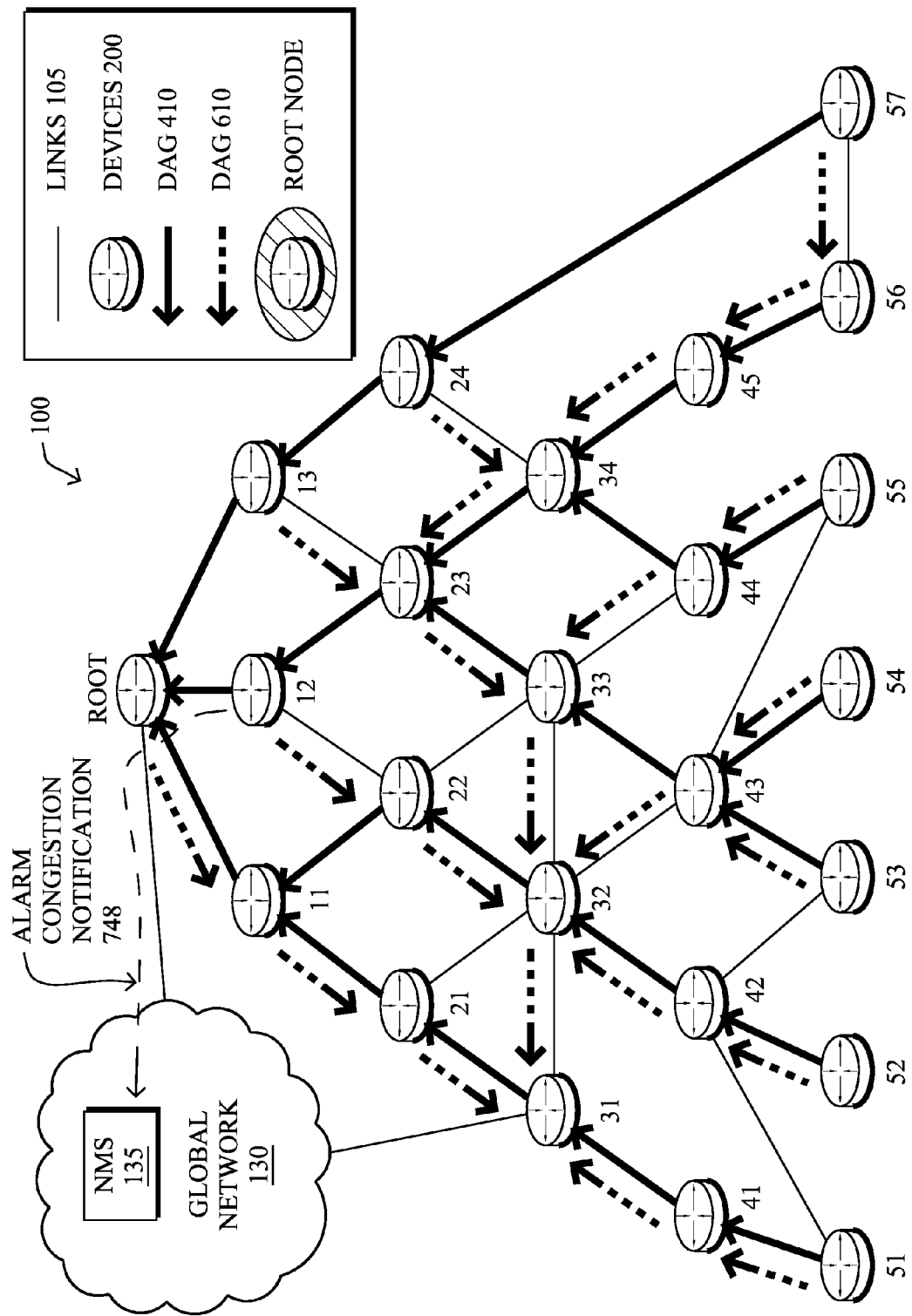
FIG. 7 illustrates an example notification of a network event.

In addition, event-driven triggers (alarms) could be used by the NMS to dynamically adjust DAG allocation. For example, if the network experiences severe congestion, nodes could send alarms to the NMS as shown in FIG. 7 (alarm 748). The NMS could in turn change the topology strategy, e.g., so as to start collecting data from other DAGs hosted at different root nodes, or potentially creating new DAGs, etc. Alternatively to a received alarm 748, a projected congestion level on the links/nodes could be determined by the NMS 135 by simulating routing computation.

For adaptive DAG allocation, e.g., in response to an updated traffic matrix and/or triggers, one or more hysteresis techniques (as may be understood in the art) could be utilized to limit a frequency of adjusting the selected optimized root devices, for example, to avoid the formation of DAGs for only short periods of time. For instance, various trade-offs are considered so as to determine when it becomes appropriate to tear down an existing DAG, form a new one, turn on/off an existing DAG (e.g., the NMS may determine that a DAG may be in sleep mode for a period of time, in which case the corresponding root node would send an "off" message indicating to all nodes to no longer use the sleeping DAG until an "on" message is sent, thus without tearing down the DAG), etc.

Figure 8:
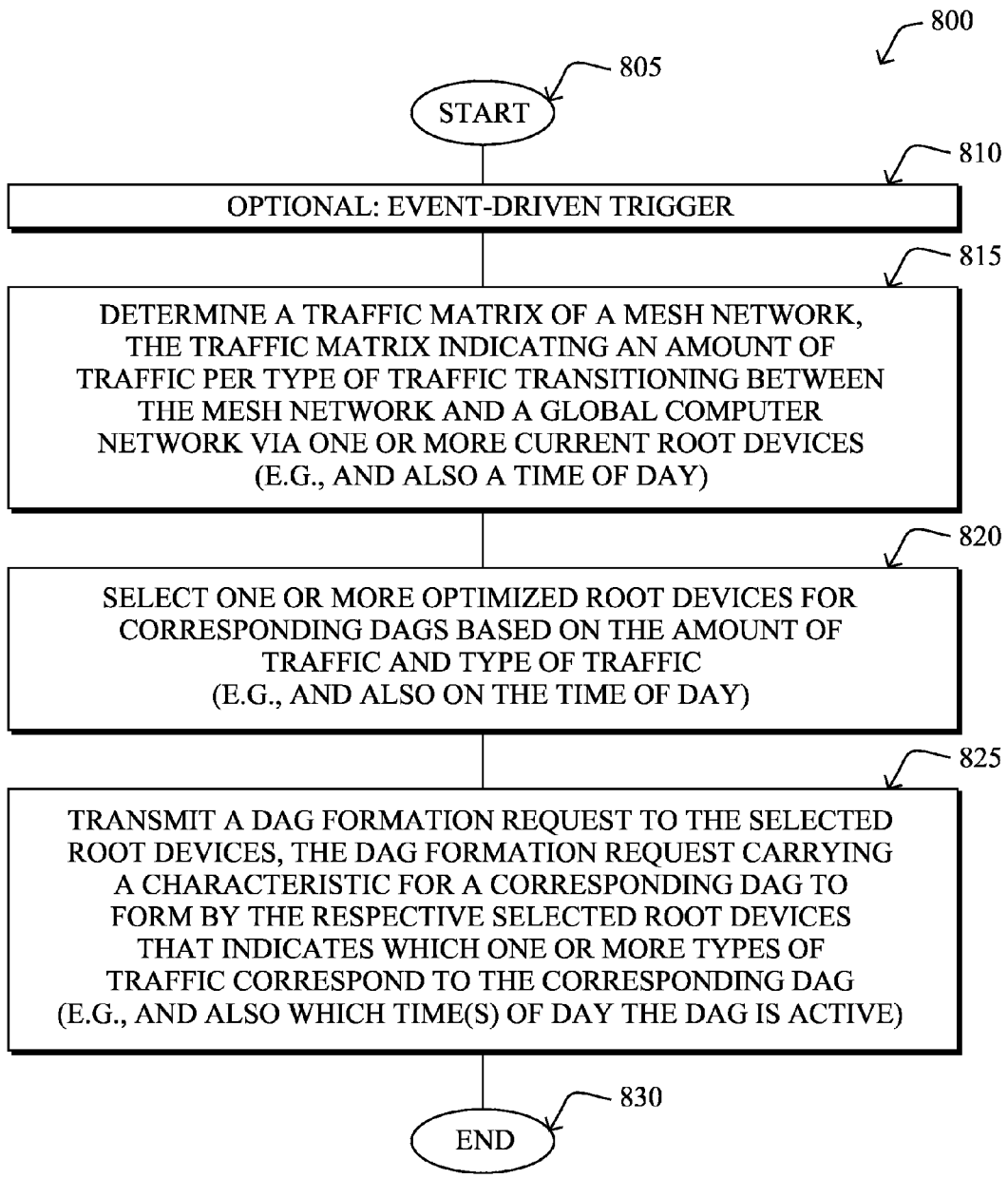
FIG. 8 illustrates an example simplified procedure for selective topology routing for distributed data collection, particularly from the perspective of a network management server.

FIG. 8 illustrates an example simplified procedure for selective topology routing for distributed data collection in accordance with one or more embodiments described herein, particularly from the perspective of the NMS 135. The procedure 800 starts at step 805, optionally in response to an event-driven trigger in step 810, and continues to step 815, where, as described in greater detail above, a traffic matrix of a mesh network is determined, where the traffic matrix indicates an amount of traffic per type of traffic transitioning between the mesh network and a global computer network via one or more current root devices (e.g., the root node of FIG. 4). Notably, as mentioned above, the traffic matrix may also be based on (track) the time of day, in order to corroborate the traffic amounts into even further meaningful results.

Based on the amount of traffic and type of traffic (e.g., and also on the time of day), in step 820 the NMS selects one or more optimized root devices for corresponding DAGs, such as node 31, and in step 825 transmits a DAG formation request 644 to the selected root devices. Specifically, as described above, the DAG formation request carries a characteristic for a corresponding DAG to form by the respective selected root device(s) that indicates which one or more types of traffic correspond to the corresponding DAG (e.g., and also which time(s) of day the DAG is active). For example, the indication may specify to the new root node 31 that its DAG is to service "type-2" traffic. Note that another DAG formation request may also be sent to the original root node(s), e.g., specifying to the original root node(s) that its currently in place DAG (e.g., 410) is to be updated to service a particular traffic type, e.g., "type-1" traffic. Alternatively, the original DAG may be left untouched, and the nodes in the mesh simply forward their traffic based on the characteristics of the newly created DAGs (e.g., "type-2" on DAG 610, and any other traffic, such as "type-1" on the original DAG 410).

The procedure 800 ends in step 830, notably with the ability to update the traffic matrix in step 810 and to further adjust the selection of root nodes and DAGs (routing topologies) based on any changes in the traffic flows over time.

Figure 9:
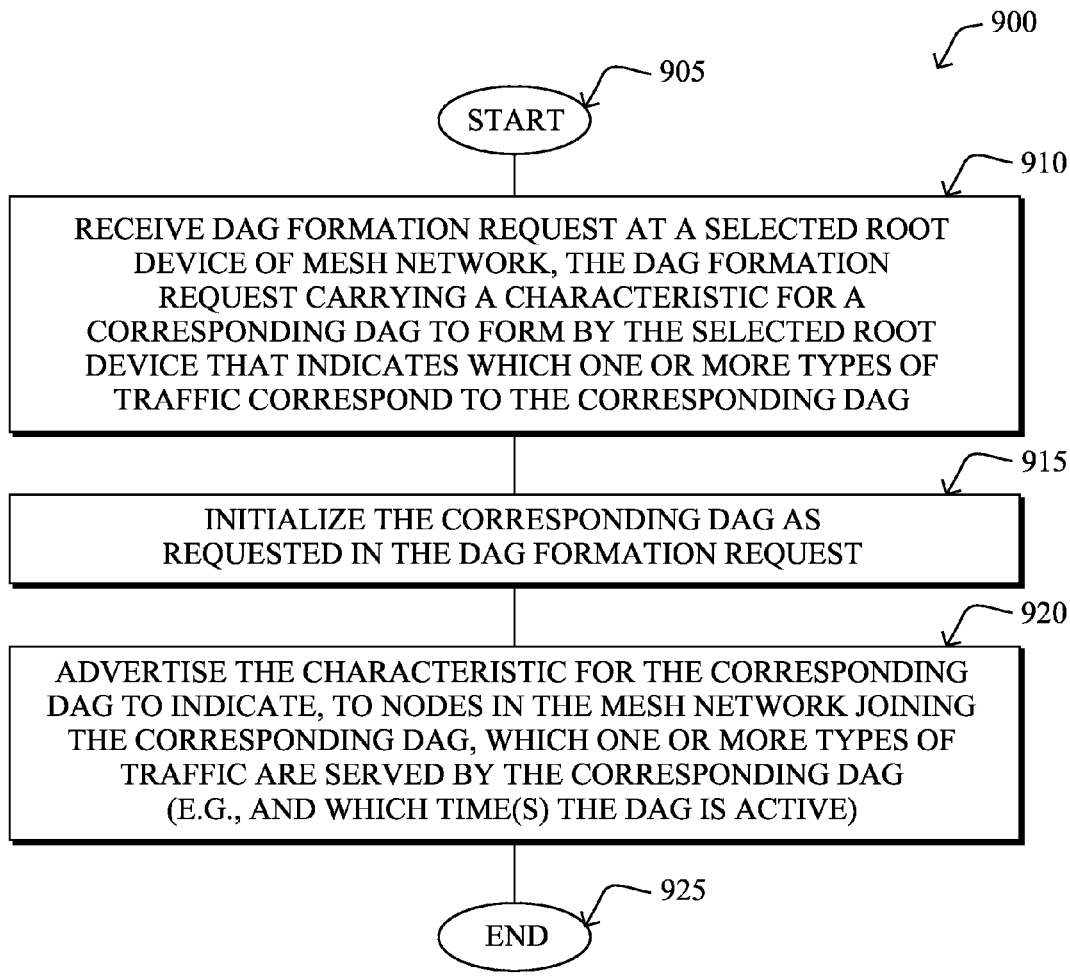
FIG. 9 illustrates an example simplified procedure for selective topology routing for distributed data collection, particularly from the perspective of a potential root node.

In addition, FIG. 9 illustrates an example simplified procedure for selective topology routing for distributed data collection in accordance with one or more embodiments described herein, particularly from the perspective of a potential root node. The procedure 900 starts at step 905, and continues to step 910, where, as described in greater detail above, the potential root node (e.g., node 31) receives a DAG formation request 644 carrying a characteristic for a corresponding DAG to form that indicates which types of traffic will be served by the new DAG. In response in step 915, the selected root node initializes the corresponding DAG 610 as requested in the DAG formation request, and then advertises the characteristic for the corresponding DAG to indicate, to nodes in the mesh network joining the corresponding DAG, which types of traffic are served by the corresponding DAG, and, in certain embodiments, which time(s) of day is the DAG active. The procedure 900 ends in step 925, notably with the DAG 610 established and active, and with the ability to receive new requests 644 based on updates determined by the NMS, as mentioned above.

Figure 10:
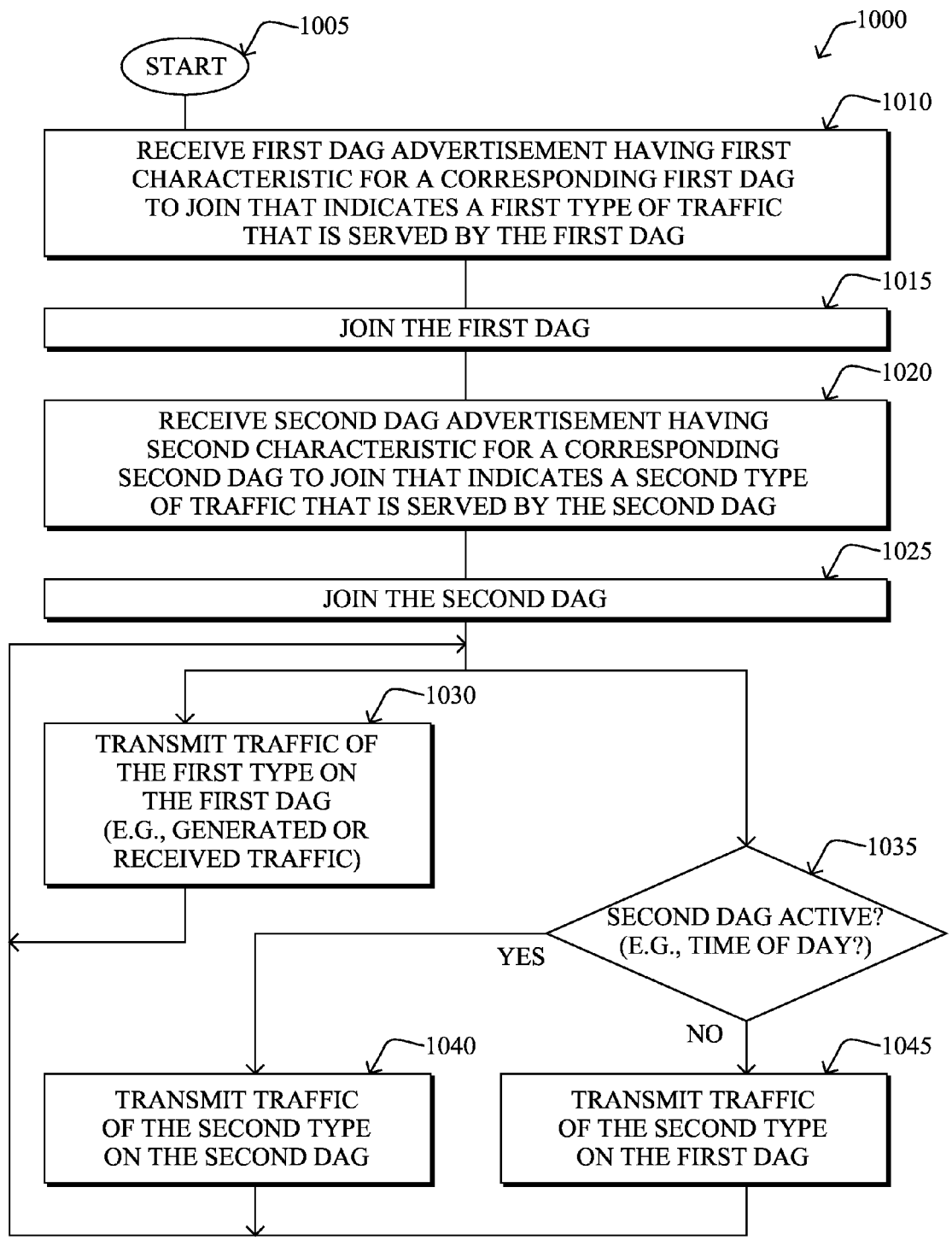
FIG. 10 illustrates an example simplified procedure for selective topology routing for distributed data collection, particularly from the perspective of a node in the mesh network.

Lastly, FIG. 10 illustrates an example simplified procedure for selective topology routing for distributed data collection in accordance with one or more embodiments described herein, particularly from the perspective of a node in the mesh network. The procedure 1000 starts at step 1005, and continues to step 1010, where the node (e.g., node 33) receives a first DAG advertisement having a first characteristic for a corresponding first DAG to join (e.g., DAG 410), and the node may join the first DAG in step 1020. In general, the first DAG advertisement may occur at a time before any other DAGs have been created for the network. At that time, there may not be any indication of a type of traffic served by the DAG, and the characteristic(s) may simply be the general DAG characteristics (e.g., an objective function). Once a second DAG is established, the DAG advertisements (e.g., DIOs) for the first DAG may (though need not, as mentioned above) indicate a first type of traffic that is served by the first DAG.

At step 1020, however, the node may receive a second DAG advertisement having a second characteristic for a corresponding second DAG to join (e.g., DAG 610) that indicates a second type of traffic that is served by the second DAG. After joining the second DAG in step 1025, and configuring traffic forwarding at the node accordingly, then traffic at the device may be forwarded accordingly, that is, where either or both of the first and second type of traffic is generated by the node (e.g., sensed data), or else is received by the node (e.g., data from other node in the mesh that is to be forwarded toward the appropriate root device).

In particular, in step 1030, the node may transmit traffic of the first type on the first DAG 410, and, assuming the second DAG is active (e.g., based on the time of day) in step 1035, may transmit traffic of the second type on the second DAG 610 in step 1040, accordingly. Notably, if the second DAG is currently inactive, then in step 1045 the node may transmit the traffic of the second type on the first DAG 410. The procedure 1000 illustratively returns to step 1030 or 1035 to transmit more traffic on the appropriate DAG, though the procedure may also return to the previous steps to receive new DAG advertisements 646 and to join the new DAGs (or to update operation of current DAGs) based on the revisions.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the two procedures are not meant to be mutually exclusive.

The novel techniques described herein, therefore, provide for selective topology routing for distributed data collection. In particular, the techniques herein are directed to an NMS-based approach consisting of building routing topologies used for data gathering (or distribution) based on traffic analysis, illustratively on a per-traffic type basis and potentially according to a specific schedule. Contrasted with current approaches, the techniques herein establish a set of root nodes as collection/distribution points in the network, thus creating a set of routing topologies. In this manner, network resources may be efficiently utilized, e.g., avoiding congestion and QoS degradation in the network.

Notably, the use of multiple routing topologies is known in terms of MTR (Multi-Topology Routing) with OSPF and ISIS, as well as the use of multiple DAGs with RPL. However, in each of these instances, the routing topologies are computed with the objective of optimizing paths according to different routing constraints and metrics to the same destination (e.g., a same root node). The techniques herein, however, use multiple routing instances for distributed data collection (particularly according to the traffic matrix) to one or more dynamically selected root nodes, and thus goes beyond the mere fact that there are multiple routing topologies used in the network.

While there have been shown and described illustrative embodiments that provide for selective topology routing for distributed data collection, it is to be understood that various other adaptations and modifications may be made within the spirit and scope of the embodiments herein. For example, the embodiments have been shown and described herein with relation to LLNs, and in particular, the RPL protocol. However, the embodiments in their broader sense are not as limited, and may, in fact, be used with other types of networks and/or suitable protocols. In particular, while root nodes for DAGs have been generally utilized in the illustrative embodiments above, other types of "sinks" and routing topologies may be equally utilized for the techniques described herein. Also, while the techniques above have generally been directed to data collection from the nodes of the mesh network toward/via the root nodes, the techniques herein are equally applicable to data transmissions from the global computer network and/or root devices toward the nodes of the mesh, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a traffic matrix of a mesh network, the traffic matrix indicating an amount of traffic per type of traffic transitioning between the mesh network and a global computer network via one or more current root devices;
    selecting one or more optimized root devices from a plurality of capable devices in the mesh network for corresponding directed acyclic graphs (DAGs) based on the amount of traffic and type of traffic; and
    transmitting a DAG formation request to the selected one or more optimized root devices, the DAG formation request carrying a characteristic for a corresponding DAG to be formed by the respective selected optimized root devices that indicates which one or more types of traffic correspond to the corresponding DAG.

2. The method as in claim 1, wherein the traffic matrix further indicates the amount of traffic and type of traffic per time of day, and wherein selecting the one or more optimized root devices for corresponding DAGs is further based on the amount of traffic and type of traffic per time of day.

3. The method as in claim 2, wherein the characteristic for a particular corresponding DAG to form further indicates a time of day during which the particular corresponding DAG is active.

4. The method as in claim 1, wherein the type of traffic is selected from a group consisting of: a particular class of service; a particular application; a particular priority of traffic; a particular data type; a particular head-end server; and a particular size of traffic.

5. The method as in claim 1, wherein selecting comprises:
    selecting a plurality of optimized root devices for corresponding DAGs, wherein the characteristics for the corresponding DAGs indicate at least one overlapping type of traffic between the corresponding DAGs.

6. The method as in claim 1, further comprising:
    adjusting the selected optimized root devices based on an updated traffic matrix.

7. The method as in claim 6, further comprising:
    utilizing hysteresis to limit a frequency of adjusting the selected one or more optimized root devices.

8. The method as in claim 1, wherein selecting the one or more optimized root devices for corresponding DAGs is in response to an event-driven trigger.

9. The method as in claim 8, wherein the event-driven trigger is in response to congestion in the mesh network.

10. An apparatus, comprising:
    one or more network interfaces to communicate with nodes of a mesh network;
    a processor coupled to the network interfaces and adapted to execute one or more processes; and
    a memory configured to store the one or more processes executable by the processor, the one or more processes when executed operable to:
        determine a traffic matrix of the mesh network, the traffic matrix indicating an amount of traffic per type of traffic transitioning between the mesh network and a global computer network via one or more current root devices;
        select one or more optimized root devices from a plurality of capable devices in the mesh network for corresponding directed acyclic graphs (DAGs) based on the amount of traffic and type of traffic; and
        transmit a DAG formation request to the selected one or more selected root devices, the DAG formation request carrying a characteristic for a corresponding DAG to be formed by the respective selected optimized root devices that indicates which one or more types of traffic correspond to the corresponding DAG.

11. The apparatus as in claim 10, wherein the traffic matrix further indicates the amount of traffic and type of traffic per time of day, and wherein selecting the one or more optimized root devices for corresponding DAGs is further based on the amount of traffic and type of traffic per time of day.

12. The apparatus as in claim 11, wherein the characteristic for a particular corresponding DAG to form further indicates a time of day during which the particular corresponding DAG is active.

13. The apparatus as in claim 10, wherein the process when executed is further operable to:
    adjust the selected optimized root devices based on an updated traffic matrix.

14. The apparatus as in claim 10, wherein selecting the one or more optimized root devices for corresponding DAGs is in response to an event-driven trigger.

15. A method, comprising:
    receiving a directed acyclic graph (DAG) formation request at a selected root device of a mesh network, the DAG formation request carrying a characteristic for a corresponding DAG to be formed by the selected root device that indicates which one or more types of traffic correspond to the corresponding DAG;
    initializing the corresponding DAG as requested in the DAG formation request; and
    advertising the characteristic for the corresponding DAG to indicate, to nodes in the mesh network joining the corresponding DAG, which one or more types of traffic are served by the corresponding DAG.

16. The method as in claim 15, wherein the characteristic for the corresponding DAG further indicates a time of day during which the corresponding DAG is active.

17. A method, comprising:
    receiving, at a node in a mesh network, a first directed acyclic graph (DAG) advertisement having a first characteristic for a corresponding first DAG to join with that indicates a first type of traffic that is served by the first DAG;
    joining the first DAG;
    receiving, at the node, a second DAG advertisement having a second characteristic for a corresponding second DAG to join with that indicates a second type of traffic that is served by the second DAG;
    joining the second DAG;
    transmitting, by the node, traffic of the first type on the first DAG; and transmitting, by the node, traffic of the second type on the second DAG.

18. The method as in claim 17, wherein the characteristic for the second DAG further indicates a time of day during which the second DAG is active, the method further comprising:

transmitting, by the node, traffic of the second type on the first DAG in response to the second DAG being inactive.

19. The method as in claim 17, wherein the traffic of at least one of the first and second type of traffic is generated by the node.

20. The method as in claim 17, wherein the traffic of at least one of the first and second type of traffic is received and forwarded by the node.

* * * * *

UNITED STATES PATENT AND TRADEMARK OFFICE
CERTIFICATE OF CORRECTION

| | | |
|---|---|---|
| PATENT NO. | : 8,619,576 B2 | |
| APPLICATION NO. | : 13/180998 | |
| DATED | : December 31, 2013 | |
| INVENTOR(S) | : Jean-Philippe Vasseur et al. | |

It is certified that error appears in the above-identified patent and that said Letters Patent is hereby corrected as shown below:

In the Specification

Column 8, line 55, please amend as shown:

[["Nedlow"]]"Netflow" traffic monitoring process available from Cisco

Signed and Sealed this
Third Day of June, 2014

Michelle K. Lee
*Deputy Director of the United States Patent and Trademark Office*